(12) United States Patent
Jones

(10) Patent No.: US 6,963,635 B1
(45) Date of Patent: Nov. 8, 2005

(54) METHOD AND SYSTEM FOR FACILITATING COLLECTION OF SUBSCRIBER PAST DUE BALANCE

(75) Inventor: Bryce A. Jones, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 210 days.

(21) Appl. No.: 10/430,493

(22) Filed: May 6, 2003

(51) Int. Cl.[7] .................... H04M 15/00; H04M 3/00
(52) U.S. Cl. ...................... 379/114.14; 379/114.03; 379/188; 379/221.01; 379/222; 370/352; 370/493
(58) Field of Search .................. 379/114.14, 114.03, 379/127.02, 188, 189, 190, 200, 222, 210.02, 379/212.01, 213.01, 218.02, 219, 221.01, 379/221.05, 223; 370/493, 352

(56) References Cited

U.S. PATENT DOCUMENTS

| | | | |
|---|---|---|---|
| 4,756,020 A * | 7/1988 | Fodale ................. | 379/114.14 |
| 5,875,236 A * | 2/1999 | Jankowitz et al. ..... | 379/114.24 |
| 6,160,877 A * | 12/2000 | Tatchell et al. ........ | 379/197 |
| 6,516,056 B1 * | 2/2003 | Justice et al. ......... | 379/145 |
| 6,522,655 B1 * | 2/2003 | Laiho ..................... | 370/410 |
| 6,553,108 B1 * | 4/2003 | Felger ................... | 379/114.01 |
| 2002/0176547 A1 * | 11/2002 | Jones .................... | 370/352 |

OTHER PUBLICATIONS

U.S. Appl. No. 09/865,267, filed May 25, 2001, entitled "Usage-Based Billing for Voice Over Packet Communications".

* cited by examiner

Primary Examiner—Quoc Tran

(57) ABSTRACT

A method and system for facilitating collection of past due balances. A control entity such as a call server or collections server receives a signaling message such as a SIP INVITE that seeks to set up a call between a calling party and called party. The control entity determines that the calling party has a past due balance, i.e., that the calling party owes the carrier money. In response, the control entity changes the signaling message to designate a collections system as the called party, and the signaling message is then used to set up a call between the calling party and the collections system.

24 Claims, 3 Drawing Sheets

METHOD AND SYSTEM FOR FACILITATING COLLECTION OF SUBSCRIBER PAST DUE BALANCE

BACKGROUND

1. Field of the Invention

The present invention relates to telephone communications and more particularly to collection of past due balances from telephone subscribers.

2. Description of Related Art

The invention is particularly applicable in the context of internet telephony (also known as voice-over-IP (VoIP) or IP telephony), which should be understood to be a telephone system in which voice is communicated via a packet switched network or link (such as the Internet, or an ATM, X.25 or other packet-switched connection) between two or more parties. Internet telephony may also be referred to as packet switched telephony.

In general, an internet telephony system facilitates telephone communication between two or more users over a packet switched network, such as an IP network for example. Each user is positioned at a telephone device (hereafter "telephone"), which is generally any communications device capable of communicating real-time media signals such as speech, audio and/or video, for example.

By way of example and without limitation, the telephone device may be a conventional analog telephone, a digital telephone, a videophone, and/or a multi-media personal computer. Each telephone device (and/or telephone number) is then typically served by a local media gateway (or "internet telephony gateway"), which provides connectivity to the packet switched network. Alternatively, the telephone device itself may provide connectivity with the packet switched network and may serve other gateway-functions as well. Such a telephone device may be referred to as an "internet telephone" and may take any of a variety of forms now known or later developed.

To place a call over a packet switched network via an initiating gateway, a user at an initiating telephone device may establish a connection with the initiating gateway via a suitable communications link such as the public switched telephone network (PSTN), via a wireless access channel, and/or via some other circuit switched or packet switched network or direct link. And the user may specify a telephone number of the called party. The initiating gateway may then query an address mapping database or consult with another device or process in the system to determine a network address of a terminating gateway that serves the called number.

In turn, the initiating gateway may contact the terminating gateway via the packet switched network, notifying the terminating gateway of a desire to establish a connection with the called party. The terminating gateway may then establish an appropriate connection with a telephone device at the called number and notify the initiating gateway that the call can proceed. With the end-to-end connection thus established between the calling and called parties, the parties may then communicate with each other over the packet switched network.

In an internet telephony system, as in any telephony system, a signaling system must be provided in order to facilitate various functions involved in setting up calls. One such signaling system is defined by the Session Initiation Protocol (SIP), which is well known to those of ordinary skill in the art.

According to SIP, each signaling endpoint includes a user agent client (UAC) application, which facilitates SIP signaling. In order for a first endpoint to initiate communication with a second endpoint, the first endpoint sends to the IP address of the second endpoint a SIP "INVITE" message, specifying the type of communication desired. If the second endpoint agrees to communicate, the second endpoint then sends to the first endpoint a SIP "200 OK" message, signaling agreement. And the first endpoint in turn sends a SIP "ACK" message to the second endpoint, to complete the session setup. The two ends may then begin communicating with each other in the specified manner.

In practice, each user in a SIP-capable system will have a personal identifier called a SIP address, typically in the form "username@realm." And the network will include a SIP registration server that correlates each user's SIP address with the IP address of the client station that the user is currently operating. When initiating a communication, the UAC on the initiating client device can then send a SIP INVITE to a local proxy server, indicating in the SIP INVITE (i) the SIP address of the calling party and (ii) the SIP address of the called party. And the proxy server can consult the SIP registration server to find out the IP address where the called party's SIP address is currently registered and can forward the SIP INVITE to that IP address. Alternatively, the initiating UAC could query a SIP redirect server to determine the destination IP address and can then itself send the SIP INVITE to that address rather than to the proxy server.

Oftentimes, a telephone device will not itself include a SIP UAC. In that event, the telephone device might instead engage in signaling communication with its local gateway through more conventional (legacy) signaling mechanisms. And the gateway might then include a UAC that can operate on behalf of the telephony device. For instance, the gateway could receive a legacy call initiation signal from the telephony device (or from a switch or other node serving the device) and could responsively generate and transmit a SIP INVITE seeking to set up the desired session over a packet-switched network. In any event, a gateway will typically either receive and send, or generate and send, a SIP INVITE on behalf of the user.

In an internet telephony system, a SIP INVITE can designate the called party by a SIP address that includes the called party's telephone number, such as sip:+1-913-555-1234@realm.com. If the called party is operating a SIP-capable telephone, then the SIP registration server may correlate that SIP address with the IP address of the telephone, so as to facilitate sending the INVITE to the called party's telephone. Alternatively, if the called party is operating a telephone that is not SIP-capable, then the SIP registration sever may correlate that SIP address with the IP address of a SIP-capable gateway serving the called party's telephone, so as to facilitate sending the INVITE to that gateway, and the gateway can then send a corresponding legacy signal to the called party's telephone.

An internet telephony system may also include a call server (or "application call server") that functions to assist the gateway in setting up and conducting calls. The call server might be owned or operated by a carrier that provides telecommunication services for designated subscribers, typically billing those subscribers for the service.

When setting up a call for a user, a gateway might signal to the call server, and the call server might then query a backend system, such as an authentication/authorization/accounting (AAA) server, to determine whether or not to allow the call to go through. In particular, the AAA server could contain profile records for each authorized user/client. And, as is known in the art, the call server could query the AAA server to determine whether the caller's account is current and valid, such as to ensure that the caller has paid all past bills, or to verify the caller's personal identification number or security code. The call server can then send a response signal to the gateway, either allowing the requested call to proceed or not.

In a SIP-based signaling system, for instance, an initiating gateway could signal to the call server by simply sending the SIP INVITE to the call server instead of to a remote signaling endpoint such as a terminating gateway or the called telephone. The call server could then query the AAA server on behalf of the initiating gateway. If the AAA server authorizes the call to proceed, the call server could then send the SIP INVITE back to the gateway for transmission in turn to the remote signaling endpoint. Alternatively, if the AAA server determines that the call should not proceed, the call server could send a failure result message (such as a SIP 600 or 700 series message) to the gateway, to prevent the call from going through.

SUMMARY

The present invention provides a mechanism for facilitating collection of past due balances from subscribers. According to an exemplary embodiment of the invention, a control entity such as a call server or collections server will receive a signaling message such as a SIP INVITE that seeks to set up a call between a calling party and called party. The control entity will then determine that the calling party has a past due balance, and the control entity will responsively modify the signaling message to designate a collections system as the called party. The modified signaling message will then pass through a packet-switched network to the collections system or to an entity serving the collections system, to facilitate setting up a call between the calling party and the collections system.

Thus, in one respect, the exemplary embodiment may take the form of a method that is carried out in a communication system of a type that transmits a call from a calling party over a packet-switched network to a network address that corresponds to a called telephone number specified by the calling party. The method may involve, during initiation of the call, receiving a signaling message that identifies the calling party and that carries a destination address indicating the called telephone number. The method may then involve making a determination that the calling party has a past due balance and responsively modifying the signaling message so as to produce a modified signaling message, in which the destination address indicates a telephone number or other identifier of a collections system instead of the called telephone number. In turn, the method may involve using the modified signaling message to set up a call between the calling party and the collections system.

In another respect, an exemplary method may first involve sending a SIP INVITE message from a gateway to a call server, where the SIP INVITE message includes (i) a source SIP-address that designates a calling party and (ii) a destination SIP-address that designates a called party. The method may then involve the call server consulting an authorization server and thereby determining that the calling party has a past due balance, and the call server responsively forwarding the SIP INVITE message to a collections server. In turn, the method may involve the collections server modifying the destination SIP address of the SIP INVITE message to designate a collections agent center instead of the called party. And the method may then involve sending the SIP INVITE message, with modified destination SIP-address, to the collections agent center, to initiate setup of a call between the calling party and the collections agent center.

In still another respect, the exemplary embodiment may take the form of a server, such as a call server or specialized collections server. The server may include a communication interface that receives and sends signaling messages, a processor, and data storage. Further, the server may comprise machine language instructions stored in the data storage, which the processor can execute in order to carry out functions such as (i) receiving receive a signaling message that identifies a calling party and a called party, (ii) determining that the calling party has a past due balance, (iii) responsively modifying the signaling message to identify a collections system instead of the called party, and (iv) outputting the modified signaling message for transmission to the collections system.

BRIEF DESCRIPTION OF THE DRAWINGS

An exemplary embodiment of the invention is described below with reference to the drawings, in which.

DETAILED DESCRIPTION OF AN EXEMPLARY EMBODIMENT

Figure 1:
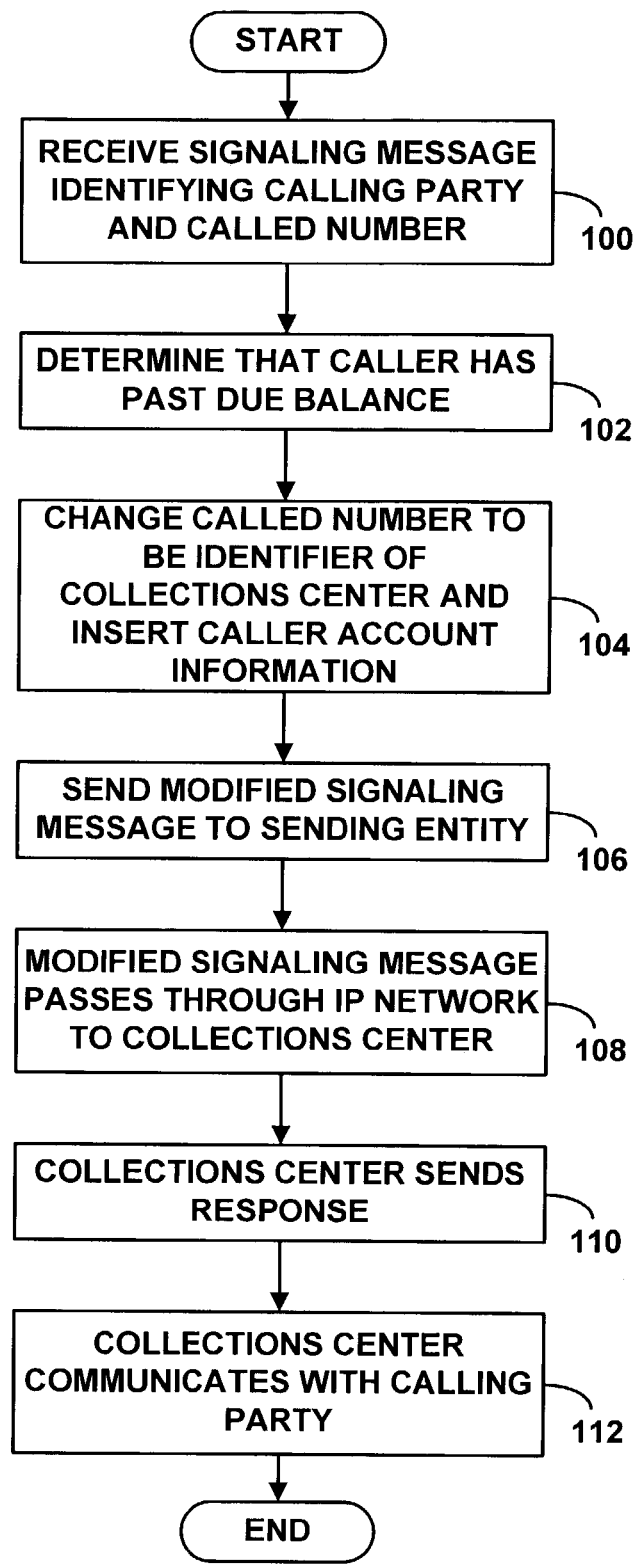
FIG. 1 is a flow chart depicting method steps that could be carried out in accordance with the exemplary embodiment.

Referring to the drawings, FIG. 1 is a flow chart depicting method steps that can be carried out in accordance with an exemplary embodiment of the present invention. As shown in FIG. 1, at block 100, when an internet telephony call is being set up for a caller, a control entity will receive from another entity a signaling message identifying the calling party and indicating the called party's telephone number. At block 102, the control entity will then determine or learn that the calling party has a past due balance, i.e., that the calling party owes the carrier money and has not timely paid. In response, at block 104, the control entity will change the called telephone number in the signaling message to be a telephone number or other identifier of a collections agent center and will insert into the signaling message information about the caller, such as an account identifier or specific account information such as the caller's name and billing history, for instance. At block 106, the control entity will then send the modified signaling message to the entity that sent it.

In turn, at block 108, the signaling message will pass through a packet-switched network to the IP address of the collections agent center, thereby giving the collections agent center the caller's name and billing history (or an account identifier that the collections center could correlate with such information through a simple database query). At block 110, the collections agent center will then send a response signaling message, and, at block 112, (upon completion of setup signaling) a collections agent may begin to communicate with the calling party. In the exemplary embodiment, the collections agent center could present the caller's account information (as indicated in or by the signaling message) to a collections agent, to assist the collections agent in speaking with the caller about paying the past due balance.

1. Exemplary Architecture

Figure 2:
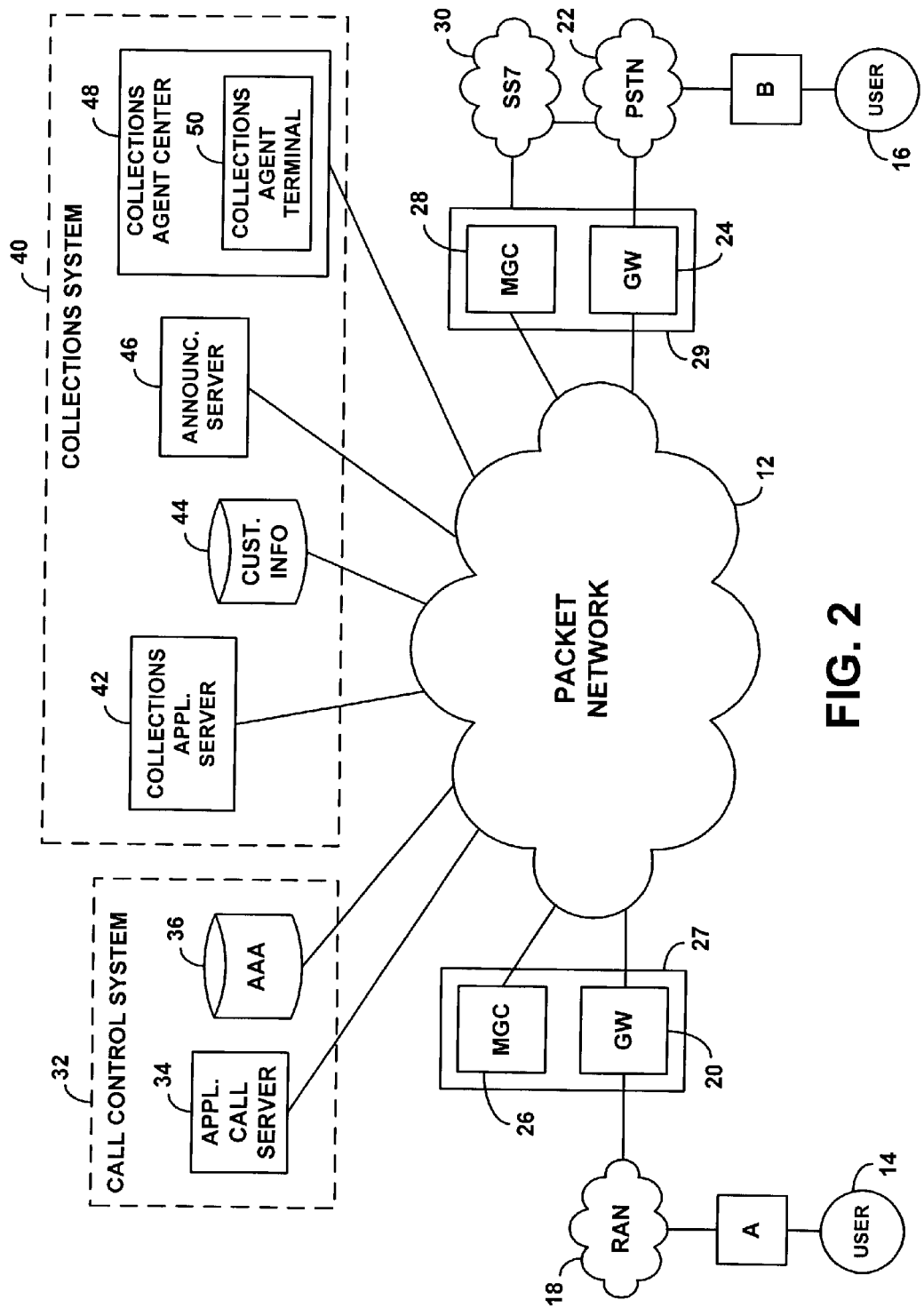
FIG. 2 is a block diagram of a communication system in which the exemplary embodiment can be employed.

FIG. 2 is a block diagram of an exemplary communication system in which this embodiment can be employed. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Still further, various functions described herein as being performed by one or more entities may be carried out by a processor executing an appropriate set of machine language instructions stored in memory. Provided with the present disclosure, those skilled in the art can readily prepare appropriate computer instructions to perform such functions.

The communication system of FIG. 2 includes at its core a packet switched network 12, which could be a single network as shown or could be a combination of multiple networks. As an example, packet network 12 could comprise a transport network that is owned and operated by a telecommunications service carrier, through which the carrier conveys signaling and bearer traffic. As another example, packet network 12 could comprise the Internet or a corporate local area network. Other examples are also possible.

Generally speaking, packet network 12 can facilitate communication between users, two of which are shown by way of example as user 14 and user 16. User 14 is positioned at a first telephone device A, and user 16 is positioned at a second telephone device B.

As noted above, each telephone device in an internet telephony system can be served by a local media gateway, which provides connectivity with the packet switched network. Alternatively, the telephone device could be an internet telephone that itself provides connectivity with the packet switched network, such as through a direct Ethernet (wired or wireless) connection to the network for instance.

By way of example, FIG. 2 shows telephone device A coupled via a radio access network (RAN) 18 with a media gateway 20, and telephone device B coupled via the PSTN 22 with a media gateway 24. Alternatively, these telephone devices could be coupled through other communication links with their respective gateways. Further, the devices could instead be served by a common gateway.

Gateways 20, 24 are further shown with associated media gateway controllers (MGCs) 26, 28, which could function conventionally as signaling servers. As such, an exemplary MGC could be arranged to interface between legacy telephony signaling (e.g., signaling compliant with Signaling System #7 (SS7)) and internet telephony signaling (e.g., SIP signaling). Further, an MGC can function as a SIP server, to forward and/or redirect SIP signaling messages on network 12.

A media gateway and its associated MGC may cooperatively define a "softswitch" that can handle both bearer traffic and signaling traffic. Thus, in the arrangement of FIG. 2 for instance, gateway 20 and MGC 26 may cooperatively one softswitch 27, and gateway 24 and MGC 28 may cooperatively define another softswitch 29.

The RAN 18 communication link between telephone device A and packet network 12 could take various forms. For example, RAN 18 could comprise a base transceiver station (BTS) that communicates with telephone device A over an air interface according to a protocol such as CDMA, TDMA, GSM, AMPS or 802.11x. Further, RAN 18 could include a base station controller (BSC) that controls the BTS and a mobile switching center (MSC) that controls the BSC. The BSC and/or MSC may then be coupled with gateway 20.

Telephone device A could, in turn, be a conventional mobile or fixed wireless terminal arranged to communicate via RAN 18. For instance, device A could be a standard 3G cell phone or wirelessly equipped multimedia computer.

As a general matter, either or both of the telephone devices A, B could include an IP stack and a SIP UAC that facilitates SIP signaling over packet network 12. Alternatively or additionally, either device could be a legacy telephone device, and its respective gateway could include an IP stack and a SIP UAC that could engage in SIP signaling on behalf of the telephone devices.

For example, telephone device A might include an IP stack and SIP UAC, and telephone device B might be a legacy telephone device that does not include an IP stack or a SIP UAC. In basic operation, when user 14 dials a phone number 1-913-555-1234 of telephone device B, device A might then responsively generate a SIP INVITE to the SIP address sip:+1-913-555-1234@realm.com and send the INVITE to softswitch 27. Softswitch 27 may then consult a SIP registration server (not shown) and learn that the SIP address is served at the IP address of remote softswitch 29. Therefore, softswitch 27 may forward the INVITE to that IP address.

Upon receipt of the INVITE, softswitch 29 may then convert the INVITE into a legacy call setup message, such as an Integrated Services Digital Network User Part (ISUP) Initial Address Message (IAM), and send the legacy call setup message it into an SS7 signaling network 30 in an effort to set up the call with telephone device B. After further conventional SIP and SS7 signaling, a VoIP session could thereby be established between telephone device A and gateway 24, and gateway 24 could extend the call to telephone device B as a legacy PSTN call.

As another example, assume that telephone device A is a legacy mobile phone (e.g., a 2G mobile station), and telephone device B is a legacy landline telephone. In that instance, gateway 20 might function as a switch (e.g., MSC) with respect to device A and, when user 14 places a call, might thus receive a call origination signal carrying dialed digits. Softswitch 27 might then engage in SIP signaling to set up a VoIP session over network 12 with gateway 24, and gateway 24 would extend the call to telephone device B as a legacy PSTN call. Other examples are possible as well.

FIG. 2 further illustrates a call control system 32, comprising an application call server (also known as a "call agent") 34 and an AAA server 36. As noted above, when a gateway sets up a call for a user, the gateway might signal to the call server 34, and the call server might in turn query the AAA server to determine whether or not to allow the call to proceed.

More particularly, as noted above, initiating softswitch 27 could send a SIP INVITE to the call server 34 instead of to a remote signaling endpoint. The call server 34 could then query the AAA server using conventional Remote Access Dial-In User Service (RADIUS) messaging for instance and, upon successful authorization of the caller, could send the SIP INVITE back to the querying gateway 20. The softswitch 27 could then forward the INVITE along to the remote endpoint such as softswitch 29. Alternatively, if call server 34 fails to authorize the user, the call server may send a SIP failure response to the initiating softswitch 27, in which case the initiating gateway would block the call from proceeding.

Figure 3:
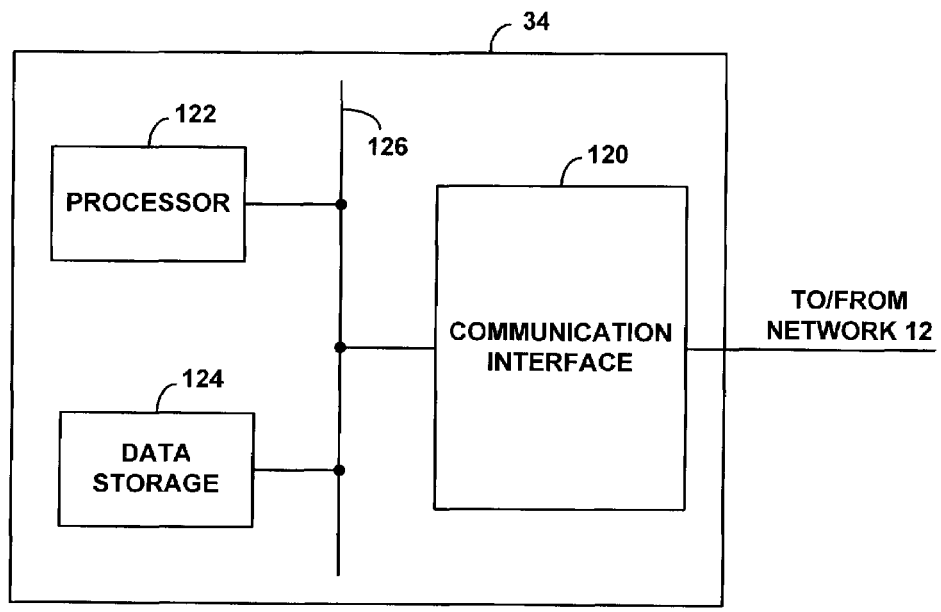
FIG. 3 is a block diagram of a call server operable in the exemplary arrangement of FIG. 2.

FIG. 3 is a block diagram depicting an exemplary application call server 34. As shown in FIG. 3, the exemplary application call server includes a communication interface 120, a processor (i.e., one or more processors) 122 and data storage 124, all connected together by a system bus, network or other mechanism 126. The communication interface 120 could be an Ethernet network interface card or other module suitable for interfacing with packet network 12, so as to receive and send signaling messages such as SIP messages. Data storage 124, in turn, may comprise volatile and/or nonvolatile storage and preferably contains machine language instructions that can be executed by processor 122 to carry out various functions described herein. For instance, the instructions could define a SIP UAC as well as logic to redirect and/or modify SIP messages.

In accordance with the exemplary embodiment, the communication system will further include a collections system 40, which could comprise a collections application server (or simply "collections server") 42, a customer information database 44, an announcement server 46, and a collections agent center 48, all of which could similarly sit as nodes on packet network.

Collections application server 42 could be a server class computer that is programmed to determine whether a given caller has a past due balance, i.e., that the caller owes the carrier money and has not timely paid, and, if so, to redirect the caller to a collections center. Further, collections application server could be programmed to function as an automatic call distribution (ACD) server for collections system 40, so as to determine which of several collections agent centers (or specific collections agent terminals) should receive a given call. ACD technology is well known in the art and is therefore not described here.

Figure 4:
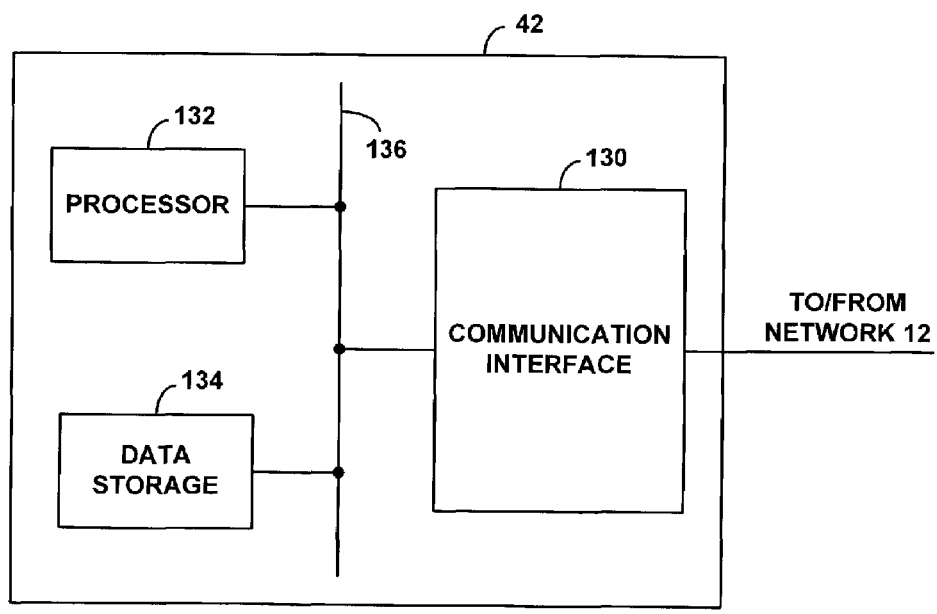
FIG. 4 is a block diagram of a collections server operable in the exemplary arrangement of FIG. 2.

FIG. 4 is a block diagram depicting an exemplary collections server 42. As shown in FIG. 4, the exemplary collections server includes a communication interface 130, a processor (i.e., one or more processors) 132 and data storage 134, all connected together by a system bus, network or other mechanism 136. The communication interface 130 could be an Ethernet network interface card or other module suitable for interfacing with packet network 12, so as to receive and send signaling messages such as SIP messages. Data storage 134, in turn, may comprise volatile and/or nonvolatile storage and preferably contains machine language instructions that can be executed by processor 132 to carry out various functions described herein. For instance, the instructions could define a SIP UAC as well as logic to redirect and/or modify SIP messages.

Customer information database 44 could then be a typical database of a carrier's customer information, which could indicate for each customer information such as mailing address, billing history and payment history. Collections application server 42 could refer to the customer information database 44 to acquire information about a given caller's billing history, which could then be presented to a collections agent to assist in call handling.

Announcement server 46 could be a media server that can play out voice announcements, such as an announcement of a currently past due bill as well as instructions to pay. Alternatively or additionally, announcement server 46 could be a more interactive system, such as a VXML based voice command platform or an interactive voice response unit (IVRU).

And collections agent center 48 could be a call center for receiving collections calls. As such, the collections agent center 48 could include a main server (e.g., a PBX server or an IVRU) that receives incoming calls, as well as one or more collections agent terminals at which human operators could work to receive and respond to collections calls. Each collections agent terminal could be a multimedia personal computer or other telephone device, at which an operator could speak with a delinquent caller. FIG. 2 depicts one collections agent terminal 50 by way of example.

2. Exemplary Operation

In exemplary operation, assume that softswitch 27 is seeking to set up an internet telephony call from user 14 to the telephone number 1-913-555-1234 of telephone B. In doing so, the softswitch may generate or receive from telephone device A a SIP INVITE that identifies the calling party (e.g., by SIP address or by some other means) and that identifies the called party's telephone number, in a SIP address such as sip:+1-913-555-1234@realm.com, for instance.

Softswitch 27 may then send that message to a local SIP server (not shown), which may programmatically redirect the SIP INVITE to a application call server 34. Alternatively, softswitch 27 may, by default, route all such SIP messages to application call server 34 for authorization.

In turn, application call server 34 may then query AAA server 36, with a conventional RADIUS message, to determine whether the caller is authorized. By reference to user records (not shown), AAA server may in turn determine that the caller has a past due balance. In this regard, for instance, the user records may include a past-due flag for the caller and/or may specify a precise past due balance for the call. Further, application call server 34 or AAA server 36 could query customer information database 44 or collections application server 42 for further information, to determine that a caller has a past due balance. AAA server 36 may then send a RADIUS response message to application call server reflecting that the caller has a past due balance.

In response to the determination that the caller has a past due balance, application call server 34 may forward the SIP INVITE to collections application server 42. Thus, the collections application server 42 would receive the SIP INVITE that identifies the calling party and that identifies the called party's telephone number, in this example the number 1-913-555-1234 of telephone B.

Collections application server 42 may then consult customer information database 44 to obtain the caller's billing history, such as a database record that reflects the caller's past bills, due dates, payments and so forth. In the exemplary embodiment, the collections application server 42 may then modify the SIP INVITE to specify as the called number a telephone number or other identifier of collections agent terminal 50 (or more generally a telephone number or other identifier of the collections center 48 that includes terminal 50), and to recite caller account information (such as an account number, or more specific information such as the caller's name and billing history).

For instance, if the telephone number of the collections agent terminal is 1-312-123-4567, then the collections application server 42 might change the destination SIP address in the SIP INVITE to be sip:+1-312-123-4567@realm.com instead of sip:+1-913-555-1234@realm.com. Further, since SIP is a text-based signaling system, the server 42 could readily insert the caller's billing history or other account information (e.g., account identifier) into a predefined field of the INVITE.

In turn, the collections application server may then return the modified SIP INVITE to the application call server 34, and the application call server 34 may return the modified SIP INVITE to the initiating softswitch 27.

Upon receipt of the modified INVITE, softswitch 27 may then query a SIP registration server to determine where to route the modified INVITE, and the registration server may correlate the destination SIP address (sip:+1-312-123-4567@realm.com) with an IP address of the collections agent center 48. Softswitch 27 may then send the modified INVITE along to that IP address. Alternatively, softswitch 27 might send the modified INVITE to a proxy server that could itself determine the destination IP address and forward the modified INVITE to that IP address.

Upon receipt of the modified INVITE, the main server at the collections agent center 48 could then send a response SIP 200 OK to the UAC at initiating softswitch 27, and switch 27 may then send a SIP ACK to the collections agent center, thereby completing set up of a call between the caller and the collections agent center 48. (Any additional signaling could be carried out as well to complete set up of the call.)

At the same time, the main server at the collections agent center 48 could select a collections agent terminal 50 to receive the call. Further, the main server could further read the caller's account information (e.g., name and billing history) from the modified INVITE (or could read the caller's account number from the modified INVITE and then using it as a key to look up the caller's account information in a database) and send that account information over a local network to the selected collections agent terminal 50 to be displayed for viewing by a collections agent. A collections agent can then proceed to discuss the past due balance with the caller, explaining the caller's past due balance and collecting payment from the caller in order to bring the caller's account current.

Alternatively, rather than involving a collections application server, it is possible that the application call server 34 itself, or some other entity, could modify the SIP INVITE to specify the telephone number of the collections agent center.

Further, it is also possible to join the announcement server 46 into the call between the caller and the collections agent center. For instance, during or after set up of the session between the caller and the collections agent center, the collections agent center could send a SIP INVITE to an announcement server 46, inviting the announcement server to join the ongoing session, and the collections agent center could include the caller's billing history in the SIP INVITE. After completing the SIP signaling to join the announcement server into the session, the announcement server could then programmatically apply conventional text-to-speech technology to play into the session an announcement regarding the caller's past due balance. After the announcement, the collection agent at terminal 50 could then handle the call.

3. Example SIP Messages

To help further illustrate operation of the exemplary embodiment, some sample SIP messages are provided here. It should be understood, however, that many variations on the form and content of these messages are possible.

These example messages assume that the calling party, "User_A" (telephone device A), has telephone number 1-913-555-6789 and the called party, "User_B" (telephone device B), has telephone number 1-913-555-1234. Further, the examples assume the collections system 40 has telephone number 1-312-123-4567.

In accordance with the exemplary embodiment, User_A may first send a SIP INVITE to application call server 34, which may appear as follows:

INVITE sip:+1-913-555-1234@ss1.sprint.com;user=phone SIP/2.0
 Via: SIP/2.0/UDP halo.com:5060
 From: User_A <sip:+1-913-555-6789@ss1.sprint.com>; user=phone
 To: User_B <sip:+1-913-555-1234@ss1. sprint.com>; user=phone
 Call-ID: 9135556789@halo.com
 CSeq: 1 INVITE
 Contact: User_A <sip:User_A@halo.com>
 Authorization:Digest username="User_A", realm="Sprint Corp SIP",
 nonce="dc3a5ab25302aa931904ba7d88fa1cf5", opaque=" ",
 uri="sip:ss1.sprint.com",
 response="ccdca50cb091d587421457305d097458c"
 Content-Type: application/sdp
 Content-Length: 132
 v=0
 o=User_A 2890844526 2890844526 IN IP4 halo.com
 s=Session SDP
 c=IN IP4 halo.com
 t=0 0
 m=audio 49170 RTP/AVP 0
 a=rtpmap:0 PCMU/8000

In the event the calling party has good credit standing, the application call server 34 may then send the INVITE along to softswitch 29, conventionally with an added "Via" field to show that the message passed via the softswitch, and omitting the authentication information that User_A had provided in the INVITE. The INVITE from application call server 34 to softswitch 29 may thus appear as follows:

INVITE sip:+1-913-555-1234@ngw1.sprint.com; user=phone SIP/2.0
 Via: SIP/2.0/UDP ss1.sprint.com:5060
 Via: SIP/2.0/UDP halo.com:5060
 Record-Route: <sip:+1-913-555-6789@ss1.sprint.com>
 From: User_A <sip:+1-913-555-6789@ss1.sprint.com>; user=phone
 To: User_B <sip:+1-913-555-1234@ss1.sprint.com>; user=phone
 Call-ID: 9135556789@halo.com
 CSeq: 1 INVITE
 Contact: User_A <sip:User_A@halo.com>
 Content-Type: application/sdp
 Content-Length: 132
 v=0
 o=User_A 2890844526 2890844526 IN IP4 halo.com
 s=Session SDP
 c=IN IP4 halo.com
 t=0 0
 m=audio 49170 RTP/AVP 0
 a=rtpmap:0 PCMU/8000

On the other hand, if the calling party is flagged with an outstanding balance, then the call would be set up to collections center 40 instead. Thus, the application call server 34 may modify the INVITE to specify the collections center SIP address instead of the called party SIP address in the "To" field, and the application server 34 may send the modified INVITE to the collections center. The modified INVITE may appear as follows:

```
INVITE  sip:+1-913-555-1234@ngw1.sprint.com;user=
   phone SIP/2.0
Via: SIP/2.0/UDP ss1.sprint.com:5060
Via: SIP/2.0/UDP halo.com:5060
Record-Route: <sip:+1-913-555-6789@ss1.sprint.com>
From: User_A <sip:+1-913-555-6789@ss1.sprint.com>;
   user=phone
To:  Collections_X  <sip:+1-312-123-4567@ss1.sprint.
   com>;user=phone
Call-ID: 9135556789@halo.com
CSeq: 1 INVITE
Contact: User_A <sip:User_A@halo.com>
Content-Type: application/sdp
Content-Length: 132
v=0
o=User_A 2890844526 2890844526 IN IP4 halo.com
s=Session SDP
c=IN IP4 halo.com
t=0 0
m=audio 49170 RTP/AVP 0
a=rtpmap:0 PCMU/8000
```

Note that this modified INVITE delivers the calling party number (Call-ID) to the collections center 40. As described above, this allows the collections center to query customer database 44 and to deliver voice and data to a collections agent terminal 50.

Alternatively, as noted above, when the call control system 32 determines that the customer is not in good standing, the call control system 32 could query collections system 40 and could receive customer account information from the collections system 40. The SIP INVITE from the application call server 34 to the collections system 40 could then include additional data related to the customer account. For instance, this additional information could be recited in a format compliant with the well known Session Description Protocol (SDP), reciting an attribute followed by a value. By way of example, the modified INVITE from the application call server 34 to the collections system 40 may then appear as follows:

```
INVITE  sip:+1-913-555-1234@ngw1.sprint.com;user=
   phone SIP/2.0
Via: SIP/2.0/UDP ss1.sprint.com:5060
Via: SIP/2.0/UDP halo.com:5060
Record-Route: <sip:+1-913-555-6789@ss1.sprint.com>
From: User_A <sip:+1-913-555-6789@ss1.sprint.com>;
   user=phone
To:  Collections_X  <sip:+1-312-123-4567@ss1.sprint.
   com>;user=phone
Call-ID: 9135556789@halo.com
CSeq: 1 INVITE
Contact: User_A <sip:User_A@halo.com>
Content-Type: application/sdp
Content-Length: 132
v=0
o=User_A 2890844526 2890844526 IN IP4 halo.com
s=Session SDP
c=IN IP4 halo.com
t=0 0
m=audio 49170 RTP/AVP 0
a=rtpmap:0 PCMU/8000
a=cust_name:Smith,Bob
a=cust_bal:-38.62
a=cust_tenure:38
a=cust_acct:consumer
a=cust_phones:12
a=cust_avg_rev:81.14
```

3. Conclusion

An exemplary embodiment of the present invention has been described above. Those skilled in the art will understand, however, that changes and modifications may be made to this embodiment without departing from the true scope and spirit of the present invention, which is defined by the claims.

I claim:

1. In a communication system that transmits a call from a calling party over a packet-switched network to a network address that corresponds to a called telephone number specified by the calling party, a method comprising:
   during initiation of the call, receiving a signaling message that identifies the calling party and that carries a destination address indicating the called telephone number;
   making a determination that the calling party has a past due balance;
   responsive to the determination, modifying the signaling message so as to produce a modified signaling message, wherein modifying the signaling message comprises changing the destination address in the signaling message to indicate an identifier of a collections system instead of the called telephone number; and
   using the modified signaling message to set up a call between the calling party and the collections system.

2. The method of claim 1, wherein the identifier is a telephone number.

3. The method of claim 1, wherein the signaling message comprises a SIP INVITE, and the modified signaling message comprises a SIP INVITE.

4. The method of claim 1, wherein modifying the signaling message further comprises inserting calling party account information into the signaling message.

5. The method of claim 4, wherein the calling party account information comprises calling party billing history information.

6. The method of claim 5, further comprising:
   the collections system receiving modified signaling message and displaying the billing history information for viewing by a collections agent.

7. The method of claim 4, wherein the account information comprises an account identifier, and wherein the method further comprises:
   the collections system reading the account identifier from the modified signaling message and using the account identifier to look up calling party billing history information; and
   the collections system displaying the billing history information for viewing by a collections agent.

8. The method of claim 4, further comprising:
   the collections agent communicating with the calling party about the past due balance.

9. The method of claim 1, further comprising:
   playing a past-due-balance announcement into the call between the calling party and the collections system.

10. The method of claim 1, wherein the communication system includes a softswitch and a call server, wherein the softswitch transmits the signaling message, and wherein:
    receiving a signaling message comprises the call server receiving the signaling message;
    making a determination that the calling party has a past due balance comprises the call server querying an authorization server and receiving a response indicating that the calling party has a past due balance.

11. The method of claim 10, wherein modifying the signaling message comprises the call server modifying the signaling message.

12. The method of claim 10, wherein the communication system further includes a collections server, wherein the call server passes the signaling message to the collections server, and wherein modifying the signaling message comprises the collections server modifying the signaling message.

13. A method comprising, in order:
sending a Session Initiation Protocol (SIP) INVITE message from a softswitch to a call server, the SIP INVITE message including (i) a source SIP-address that designates a calling party and (ii) a destination SIP-address that designates a called party;
the call server consulting an authorization server and thereby determining that the calling party has a past due balance;
responsive to the calling party having a past due balance, the call server forwarding the SIP INVITE message to a collections server;
the collections server modifying the destination SIP address of the SIP INVITE message to designate a collections agent center instead of the called party; and
sending the SIP INVITE message, with modified destination SIP-address, to the collections agent center, to initiate setup of a call between the calling party and the collections agent center.

14. The method of claim 13, further comprising:
the collections server inserting calling party account information into the SIP INVITE message.

15. The method of claim 14, wherein the calling party account information comprises calling party billing history information.

16. The method of claim 15, further comprising:
the collections system displaying the billing history information for viewing by a collections agent.

17. The method of claim 14, wherein the account information comprises an account identifier, and wherein the method further comprises:
the collections system using the account identifier to look up calling party billing history information; and
the collections system displaying the billing history information for viewing by a collections agent.

18. A call server for facilitating collection of past due balances from subscribers over a packet-switched network comprising:
a communication interface for receiving and sending signaling messages;
a processor;
data storage; and
machine language instructions stored in the data storage and executable by the processor (i) to receive a signaling message identifying a calling party and a called party, (ii) to determine that the calling party has a past due balance, (iii) to responsively modify the signaling message to identify a collections system instead of the called party, and (iv) to output the modified signaling message for transmission to the collections system.

19. The server of claim 18, wherein the machine language instructions are further executable by the processor to insert into the signaling message an indication of the calling party's billing history.

20. The server of claim 18, wherein the signaling message comprises a Session Initiation Protocol (SIP) INVITE message.

21. In a communication system that transmits a call from a calling party over a packet-switched network to a network address that corresponds to a called telephone number specified by the calling party, the improvement comprising:
means for receiving a signaling message that identifies the calling party and that carries a destination address indicating the called telephone number;
means for making a determination that the calling party has a past due balance;
means for responding to the determination by modifying the signaling message so as to produce a modified signaling message, wherein modifying the signaling message comprises changing the destination address in the signaling message to indicate a identifier of a collections system instead of the called telephone number; and
means for using the modified signaling message to set up a call between the calling party and the collections system.

22. The improvement of claim 21, wherein the signaling message comprises a Session Initiation Protocol (SIP) INVITE, and the modified signaling message comprises a SIP INVITE.

23. The improvement of claim 21, wherein modifying the signaling message further comprises inserting into the signaling message billing history information for the calling party.

24. The improvement of claim 21, further comprising:
an announcement server arranged to play a past-due-balance announcement to the calling party.

\* \* \* \* \*